J. F. JOY.
HAND TOOL.
APPLICATION FILED DEC. 16, 1909.
1,008,157.
Patented Nov. 7, 1911.
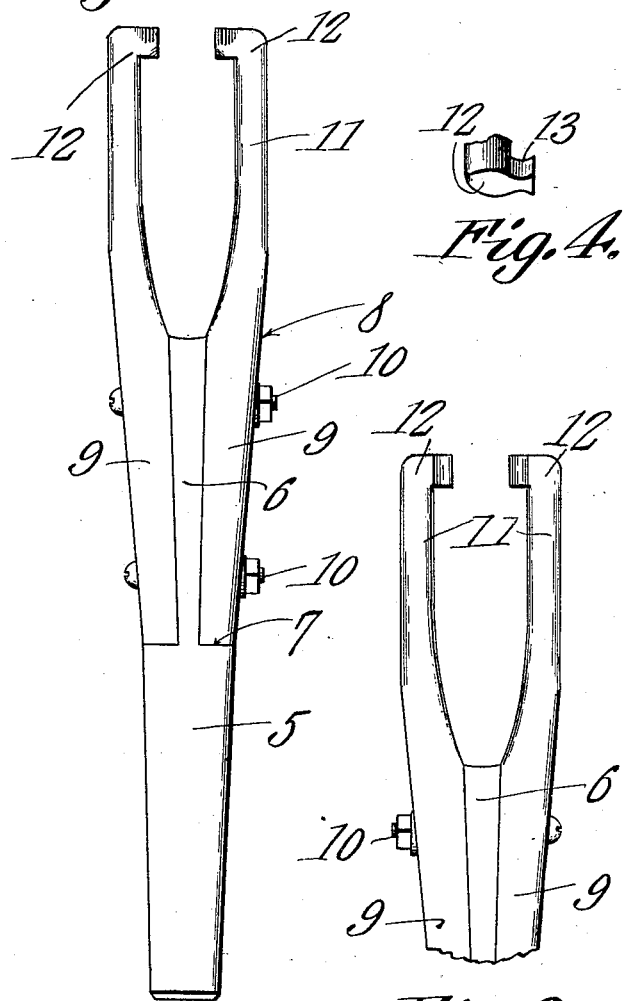
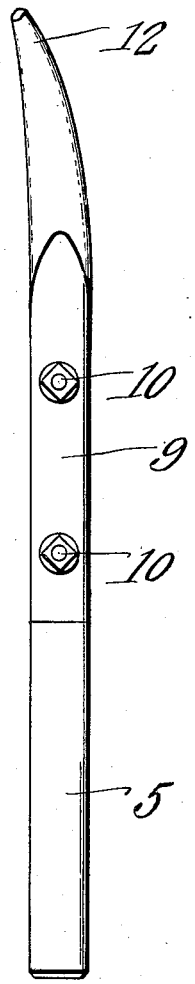
Witnesses
Inventor
John F. Joy.
By C. A. Snow & Co.
Attorneys

UNITED STATES PATENT OFFICE.

JOHN F. JOY, OF HICKORY, NORTH CAROLINA.

HAND-TOOL.

1,008,157. Specification of Letters Patent. Patented Nov. 7, 1911.

Application filed December 16, 1909. Serial No. 533,415.

*To all whom it may concern:*

Be it known that I, JOHN F. JOY, a citizen of the United States, residing at Hickory, in the county of Catawba and State of North Carolina, have invented a new and useful Hand-Tool, of which the following is a specification.

It is the object of the present invention to provide an improved tool for use in applying clencher tire casings to wheel rims.

The device of the invention embodies a handle or shank, and spaced legs which are to be engaged at their ends with one flange of a wheel rim while the near edge of the tire casing bears against the body portions of the legs.

The invention aims to provide a broad and substantial bearing for the tire casing without materially widening the tool.

Further the invention aims to so construct the tool that either of the legs thereof may be removed or replaced if broken.

In the accompanying drawings:—Figure 1 is a view in elevation of the tool, Fig. 2 is a similar view but looking at the other side thereof, Fig. 3 is a side elevation of the tool, Fig. 4 is an end view of one of the legs of the tool.

The handle or shank of the tool is comparatively short and is indicated by the numeral 5. This handle is formed at one end with a tang 6 which extends in alinement therewith, is of less width than but the same thickness as the handle, and is gradually widened in the direction of its extremity. The formation of this tang at the end of the handle results in a shoulder 7 at each side of the tang.

The legs of the tool are indicated by the numeral 8 and each includes a body portion 9 having a plane face disposed against one side face of the tang 6 of the tool handle, the inner end of this body portion resting against the corresponding shoulder 7 of the handle. The body portions of the legs are of the same thickness as the tang 6 and the said legs are securely held assembled with the tang by means of bolts 10 engaged through these elements. By so connecting the legs with the tang of the handle, they are securely held against displacement although they may be readily disconnected therefrom should they become broken and the substitution of a new leg become necessary. The outer faces of the two legs 8 are substantially parallel whereas their inner or opposed sides are concaved or bowed as at 11, the legs at their extremities being broadened so as to afford feet 12 which are comparatively flat at the front and rear and project solely inwardly. Each of the feet 12 is formed in its front and rear faces with a concavity or depression 13, groove-like in form. It will be observed from an inspection of Fig. 3 of the drawings that the legs 8 are bent or curved forwardly so that a tire-casing receiving concavity is afforded at the front of the tool.

In using the tool, the same is disposed straddle the tire casing with the usual wires at the edges of the casing seating in the short grooves 13 at the ends of the legs of the tool. With the tool in this position, it is moved around the tire circumferentially and pressure is exerted at the same time in the direction of the groove in the wheel rim in which the tire is to be seated. The tire casing being compressed between the legs it may be readily disposed in said groove by thus manipulating the tool, as will be readily understood.

What is claimed is:—

1. A device of the class described comprising a handle having outwardly laterally bowed legs extending therefrom and spaced apart a greater distance inwardly of their ends than at their said ends, each leg being formed of greater breadth at its end than at other points in its length and formed in one face of its broadened portion with a groove, the grooves being located inwardly of the line of extent of the inner edges of the respective legs and being adapted to receive the edges of an outer tire tube straddled by the legs.

2. A device of the character described, including a handle member having outwardly and laterally bowed legs spaced apart a greater distance inwardly of their ends than at those points, each leg being provided at end with an inwardly extending lug, said lug having a groove in one face thereof, the grooves being adapted to receive the edges of an outer tire-tube, strided by said legs.

In testimony that I claim the foregoing as my own, I have hereto affixed my signature in the presence of two witnesses.

JOHN F. JOY.

Witnesses:
C. M. SHUFORD,
J. H. SHUFORD.